United States Patent [19]

Stortz

[11] 4,182,182

[45] Jan. 8, 1980

[54] VEHICLE THERMOMETER FOR MEASURING OUTSIDE TEMPERATURE

[75] Inventor: Robert K. Stortz, Brookfield, Wis.

[73] Assignee: Harman International Industries, Inc., Southfield, Mich.

[21] Appl. No.: 939,785

[22] Filed: Sep. 5, 1978

[51] Int. Cl.² .................. G01K 1/14; G01K 13/02
[52] U.S. Cl. .................................. 73/343 R; 73/349
[58] Field of Search .............. 73/343 R, 349, 368.6, 73/350, 340

[56] References Cited

U.S. PATENT DOCUMENTS

| | | | |
|---|---|---|---|
| 2,638,785 | 5/1953 | Vacanti | 73/343 R |
| 3,107,533 | 10/1963 | Le Van et al. | 73/368.6 |
| 3,170,328 | 2/1965 | Werner et al. | 73/349 |
| 3,512,414 | 5/1970 | Rees | 73/349 |
| 3,842,675 | 10/1974 | Hunt | 73/363.9 |

Primary Examiner—S. Clement Swisher
Attorney, Agent, or Firm—William A. Denny

[57] ABSTRACT

A thermometer for use in a vehicle to indicate the outside temperature to the driver. A rotary drum temperature indicator is located within the driver's compartment of the vehicle while a bimetallic sensing unit is located outside the compartment. The sensing unit is mechanically coupled to the drum indicator and extends therefrom into the housing of a rear view mirror. The housing contains openings which admit the outside air. When the vehicle is in motion a stream of air flows through these openings and is directed to flow over the sensing unit so that the temperature of the latter conforms to the temperature of the outside air. As the temperature changes, the sensing unit causes a proportionate rotation of the rotary drum relative to a reference line so that the position of a temperature scale imprinted upon the drum may be read relative to the reference line for determining the outside temperature. A resilient insulating sleeve encircles a stem member extending between the indicator and the sensing unit so as to isolate the sensing unit from air inside the vehicle. The thermometer is rotatably adjustable to permit adjustment of the indicator for individual eye levels.

7 Claims, 6 Drawing Figures

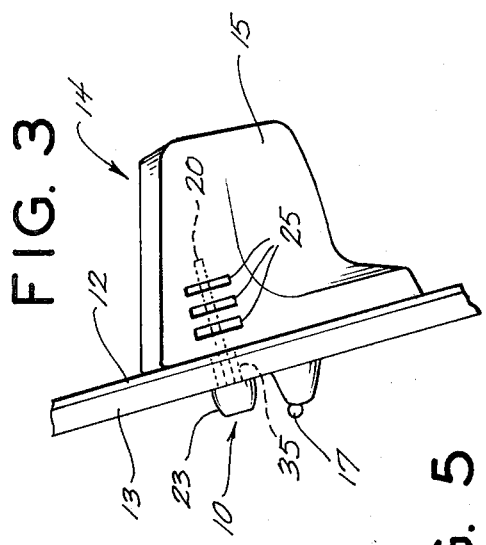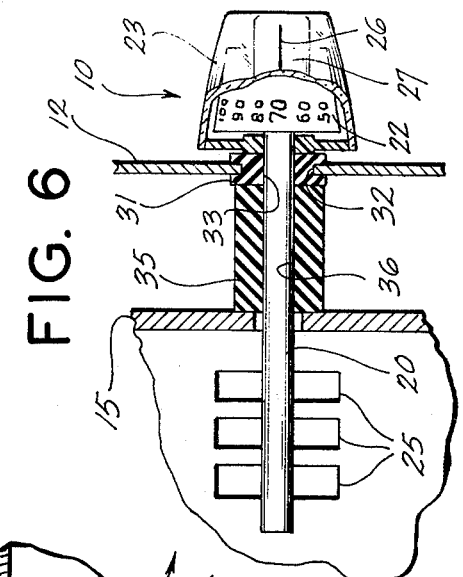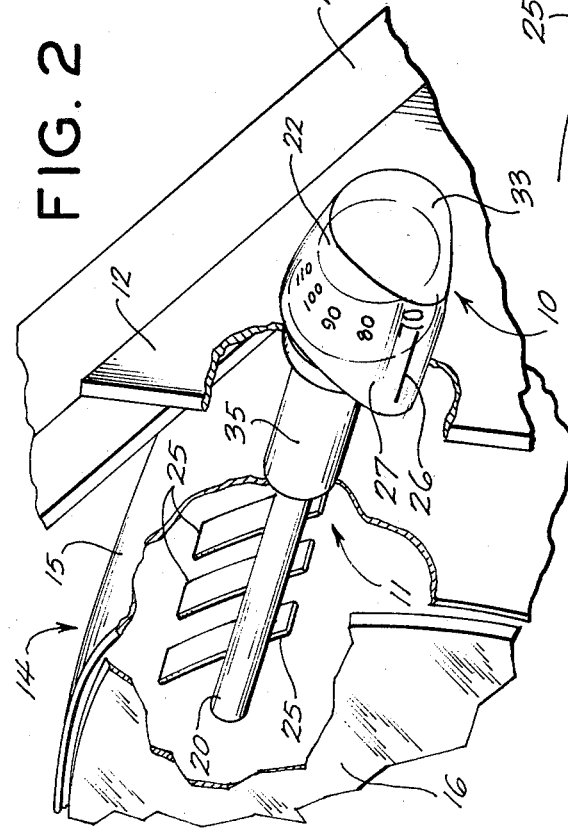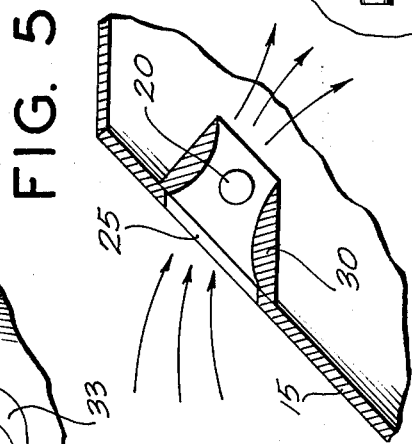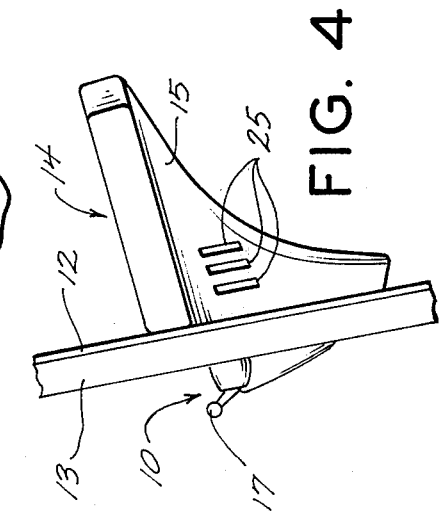

VEHICLE THERMOMETER FOR MEASURING OUTSIDE TEMPERATURE

BACKGROUND OF THE INVENTION

It has been found to be advantageous for the driver of a vehicle to be aware of the outside or ambient temperature. For example, when the temperature reaches the freezing point greater caution can be exercised particularly when traversing overpasses and the like. As a result, thermometers have been provided, usually in conjunction with the rear view mirror that is mounted on the outside of the vehicle adjacent to the driver. Examples are illustrated in U.S. Design Pat. Nos. 162,098; 119,239 and 132,316 and in U.S. Pat. No. 3,842,675.

U.S. Pat. No. 3,842,675 shows a thermometer for indicating the air temperature outside a vehicle but it has disadvantages. For example, it is inconvenient for the driver to read the thermometer accurately. Moreover, the window and the thermometer can become dirty and add to the difficulty of getting an accurate reading.

The present invention overcomes these disadvantages by mounting the sensing unit of a thermometer on the exterior of the automobile in a protected location and coupling it to a temperature indicator located interiorly of the vehicle convenient to the driver.

Accordingly, it is a general object of the present invention to provide an improved vehicle thermometer for informing the driver of the vehicle of the outside temperature.

It is a further object of the invention to provide a vehicle thermometer in which the temperature indicator is inside the vehicle and the sensing unit is located exteriorly in such fashion that it is unaffected by air inside the vehicle.

SUMMARY OF THE INVENTION

The invention utilizes a thermometer in which an indicator drum is rotated by a shaft connected to a bimetallic element enclosed in a protective tubular stem. The indicator drum is located on the driver's interior side of the vehicle door. The stem extends axially therefrom through the door and into the interior of the outside mirror housing.

The front face of the mirror housing has a plurality of openings in it to admit the outside air. When the vehicle is in motion the outside air flows through these openings and over the stem so that the stem is brought to substantially the same temperature as the outside air. The air escapes from the housing about the periphery of the mirror since there is a space between the mirror and the walls of the housing. Preferably, the air flow is directed across the stem, rather than axially along it, so as to provide a faster reaction when the vehicle first starts to move. Directing the air flow across the stem also gives better accuracy at slower vehicle speeds.

The stem of the thermometer extends through a rubber grommet in a panel on the vehicle door. The position of the stem between the door panel and the mirror housing is enclosed in an insulating sleeve which is slightly compressed in the assembly to assure a tight seal and prevent air within the vehicle escaping and distorting the temperature reading. Such mounting also enables the driver to rotate the thermometer as a unit to position the indicator dial for his convenience.

The foregoing and other objects of this invention, which will become more fully apparent from the following detailed description, may be achieved by means of the exemplifying apparatus depicted in and set forth in this specification in connection with the accompanying drawings.

DESCRIPTION OF THE DRAWING

FIG. 2 is a perspective view of the parts shown in FIG. 1 with portions broken away to show the entire thermometer with its stem located within the rear view mirror housing in the path of the outside air flowing through openings in the housing.

FIG. 3 is a front view of the rear view mirror housing mounted on the vehicle door and showing the thermometer indicator extending from an interior wall of the door;

FIG. 4 is a plan view of the rear view mirror housing mounted on the vehicle door and showing the thermometer indicator extending from an interior wall of the door;

FIG. 5 is fragmentary sectional view showing directional vanes extending from an air admitting opening in the rear view mirror housing; and FIG. 6 is a sectional view illustrating the thermometer indicator with its stem extending through the wall of the vehicle door and into the rear view mirror housing.

DETAILED DESCRIPTION

Figure 1:
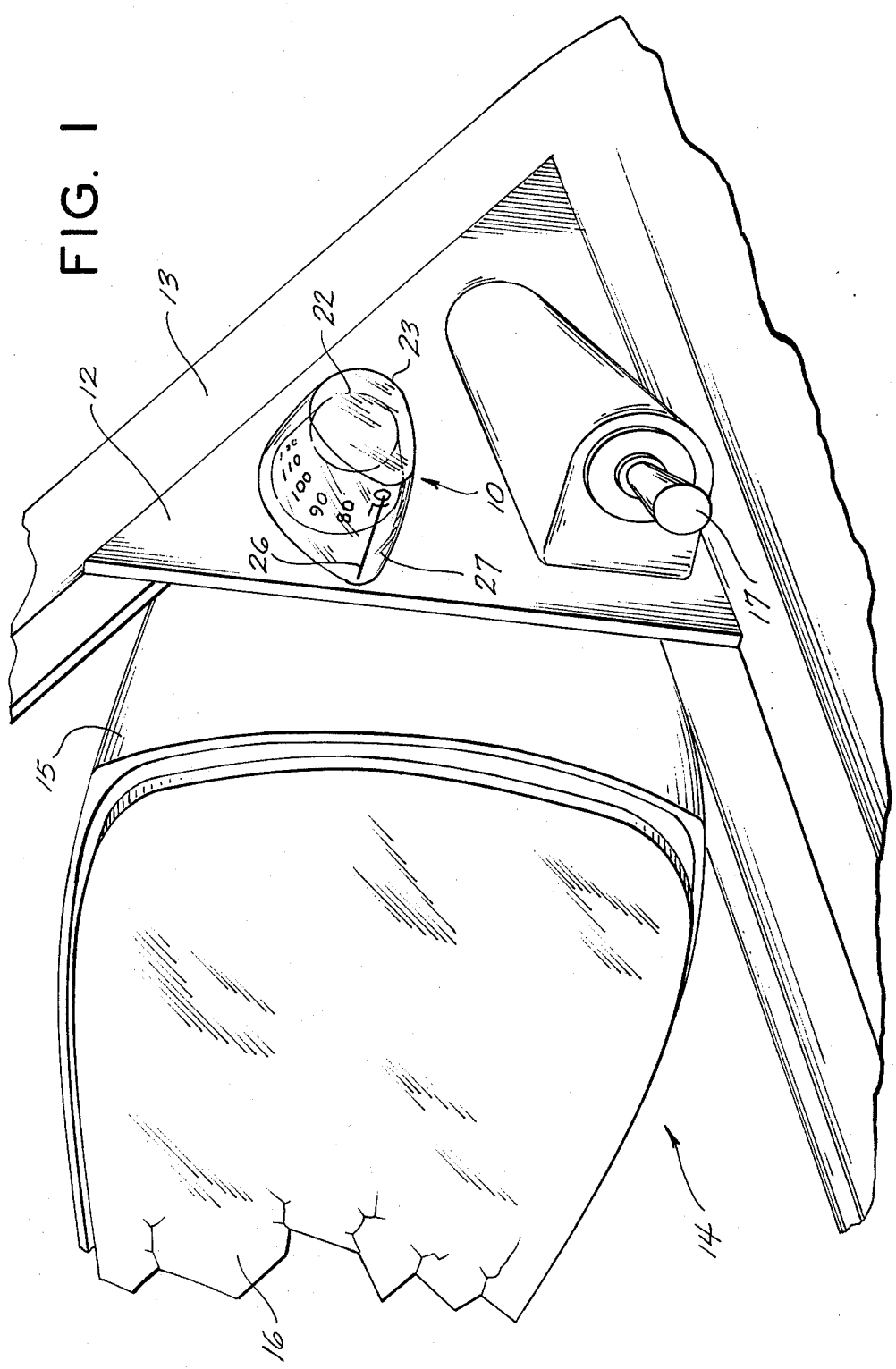
FIG. 1 is a perspective view showing a thermometer indicator mounted on the driver's door of a vehicle within the driver's compartment in conjunction with an outside rear view mirror.

Reference is now made to the drawings. In FIG. 1 and FIG. 2 thereof there is illustrated an indicator 10 of a thermometer generally identified in FIG. 2 by the reference numeral 11. The indicator 10 is mounted on a panel 12 attached to door 13 of a motor vehicle. The thermometer 11 cooperates with an outside rear view mirror generally identified by the reference numeral 14 and comprising a housing 15 and a mirror 16 carried thereby. The mirror 16 is adjustable in the housing 15 by an adjusting lever 17 which does not form a part of this invention and will therefore not be described.

The thermometer 11 illustrated herein is of the type described in detail in U.S. Pat. No. 3,842,675. It comprises generally the indicator 10 disposed within the driver's compartment of the automobile and having an elongated tubular sensing unit 20 which extends through the panel 12 and into the interior of the rear view mirror housing 15. The indicator 10 comprises an indicator drum 22 covered by a clear plastic crystal 23 as best shown in FIGS. 2 and 6. The indicator drum 22 is coupled to a shaft (not shown) which extends into the sensing unit 20 and is connected to a helical bimetallic element (not shown) also located in the sensing unit 20.

A plurality of slots 25 are formed in the front face of the housing unit 15. The sensing unit 20 is disposed directly behind these slots. Accordingly, when the vehicle is in motion, the outside air enters the slots 25 and passes over the sensing unit 20 to bring the temperature of the sensing unit 20 into accordance with the temperature of the outside air. The air entering through the slots 25 escapes from the housing through the space that exists between the periphery of the mirror 16 and the wall of the housing 15. The sensing unit 20 causes rotation of the indicator drum shaft (not shown) to adjust the angular orientation of the drum 22 relative to the crystal 23.

The outside temperature appears on that portion of the drum 22 in alignment with reference line 26 on the crystal 23. The crystal 23 includes a thickened portion 27 at the location of the reference line 25 which serves as a magnifier to enlarge the temperature scale imprinted on the indicator dial 22 to further enhance the ability of the driver to conveniently read the temperature.

In the event that the sensing unit 20 cannot be located in the most efficient position with respect to the slots 25 the accuracy of the unit may be maintained by mounting a vane structure 30 at each slot 25 as shown in FIG. 5 for directing the flow of air over the sensing unit 20 in the most efficient manner.

The passenger compartments of modern vehicles are pressurized so that the air within the compartment will escape through any available opening. It is therefore essential that the opening through which the sensing unit 20 extends be efficiently sealed to prevent the escape of air conditioned air in the summer time and heated air in the winter time which would adversely affect the reading of the thermometer 11. Accordingly, the unit is sealed as shown in FIG. 6 by a rubber grommet 31 and an insulating sleeve 35. The grommet 31 is mounted within an opening 32 formed in the panel 12 and is provided with a concentric opening 33 for receiving the sensing unit 20. The sensing unit 20 fits tightly within the opening 33 for frictionally securing the sensing unit 20 in place while permitting it to be rotated relative to the grommet 31.

To further protect the sensing unit 20 from air escaping from the passenger compartment of the vehicle, a compressible insulating sleeve 35 made of foam rubber or the like encompasses that portion of the sensing unit 20 which is disposed in the space between the panel 12 and the rear view mirror housing 15. One end of the sleeve 35 bears against the grommet 31 and the other end bears directly against the wall of the housing 15. The sleeve 35 is compressed between the grommet 31 and the housing 15 so that it ends bear firmly against the abutting structures and the wall of its central bore 36 is forced against the periphery of the sensing unit 20. Thus, the combination of the rubber grommet 31 with the insulating sleeve 35 forms a very effective seal which prevents the escape of air from the vehicle passenger compartment over the sensing unit 20.

From the above description it is apparent that the sensing unit 20 is frictionally retained by the grommet 31 and the foam rubber sleeve 35. Accordingly, it may be rotated relative to its supporting structure, and to this end, the crystal 23 is coupled to the sensing unit 20 so that the entire thermometer 11 may be rotated as a unit. The driver can therefore readily adjust the angular orientation of the thermometer 11 by grasping the dial 23 and rotating it relative to the panel 12 for adjusting the position of the reference line 26 so that it will be located in a position most convenient to him for reading the scale of the thermometer.

From the foregoing detailed description of the illustrative embodiment of the invention set forth herein it will be apparent that there has been provided an improved vehicle thermometer for measuring outside temperature in which the sensing unit is located outside of the driver's compartment of the vehicle and the temperature indicator is carried within the compartment for convenient reading. Although the sensing unit must pass from inside the compartment through a panel to a location outside the compartment, an improved and efficient sealing means has been provided to prevent the air from the driver's compartment from affecting the temperature reading. In addition, the sensing unit for reading the outside air temperature is protected within the housing of the outside rear view mirror while admitting the outside air to pass over the sensing unit for accurate temperature readings.

Although the illustrative embodiment of the invention has been described in considerable detail for the purpose of disclosing a practical, operative arrangement by means of which the invention may be practiced advantageously, it is to be understood that the particular apparatus illustrated and described is intended to be illustrative only and that the various novel characteristics of the invention may be incorporated in other structural forms and methods without departing from the spirit and scope of the invention as defined in the subjoined claims. For example, the invention is equally applicable for use on a vehicle door on the passenger's side of the vehicle.

The principles of this invention having now been fully explained in connection with the forgoing description, I hereby claim as my invention:

1. A thermometer for indicating inside an enclosed vehicle the temperature outside the vehicle wherein the vehicle has a rear view mirror mounted in a housing, including a temperature indicator and a sensing unit coupled to said temperature indicator; wherein the improvement comprises means mounting said temperature indicator within the driver's compartment; means supporting said sensing unit outside the driver's compartment within the mirror housing for protecting said sensing unit from damage while exposing it to the outside air; means for admitting the outside air into said housing to encompass said sensing unit so that its temperature corresponds to the temperature of the outside air; and means insulating said sensing unit from the air inside the vehicle.

2. A thermometer according to claim 1 wherein said air admitting means comprises openings in the front face of said rear view mirror housing; and a space between the mirror and the walls of said housing through which the air entering the openings may escape from the housing.

3. A thermometer according to claim 1 wherein the vehicle includes a door for gaining access to the driver's compartment; a panel on said door; a housing carried by the exterior of said door so that it is disposed outside of the driver's compartment; and a rear view mirror carried by said housing, said temperature indicator being mounted on said panel within the driver's compartment, said sensing unit extending outwardly from said temperature indicator through said panel and into said housing; and means for admitting the outside air into said housing to encompass said sensing units so that the temperature of said sensing unit will correspond to the temperature of the outside air.

4. A thermometer according to claim 3 wherein said temperature indicator is a rotary drum having temperature indicia printed on its periphery; an annular crystal enclosing said rotary drum while permitting said drum to rotate relative to said crystal; a reference line on said crystal to cooperate with the indicia on said drum for reading the temperature; and a magnifying lens incorporated in said crystal at said reference line to enlarge the indicia for facilitating the reading of the temperature.

5. A thermometer according to claims 3 or 4 including sealing means for sealing the space between said sensing unit and said panel to prevent the air from the driver's compartment from escaping about said sensing unit and affecting the reading on the thermometer.

6. A thermometer according to claim 5 wherein said sensing unit is of elongated tubular construction and said sealing means comprises a resilient grommet having a concentric hole through which said sensing unit passes to provide a resilient seal while holding the sensing unit in place by friction so that the driver can rotate the thermometer as a unit by grasping said crystal to position said reference line in the most convenient angular location.

7. A thermometer according to claim 6 including a resilient foam sleeve between said panel and the wall of said housing, said sensing unit passing from said grommet into said sleeve which is compressed between said housing and said panel so that its ends seal the apertures through which the stem of the thermometer extend and thereby isolate the the sensing unit from air coming from the driver's compartment.

* * * * *